United States Patent [19]
Angles et al.

[11] Patent Number: 5,641,152
[45] Date of Patent: Jun. 24, 1997

[54] VIBRATION DAMPER AND A BEARING SUPPORT FOR A VIBRATION DAMPER

[75] Inventors: Manfred Angles, Oerlenbach; Günther Handke, Euerbach; Robert Pradel, Röthlein/Heidenfeld, all of Germany

[73] Assignee: Fichtel & Sachs AG, Schweinfurt, Germany

[21] Appl. No.: 555,825

[22] Filed: Nov. 9, 1995

[30] Foreign Application Priority Data

Nov. 10, 1994 [DE] Germany .......................... 44 40 030.6

[51] Int. Cl.$^6$ .............................. B60G 13/00; F16F 9/54
[52] U.S. Cl. .................... 267/220; 188/321.11; 267/33; 267/294; 267/293
[58] Field of Search ........................ 267/220, 33, 293, 267/292, 294, 153; 280/668, 673, 716; 188/321.11

[56] References Cited

U.S. PATENT DOCUMENTS 5,248,134  9/1993  Ferguson et al. ...................... 267/220

FOREIGN PATENT DOCUMENTS 4239889  6/1994  Germany .

*Primary Examiner*—Douglas C. Butler
*Attorney, Agent, or Firm*—Nils H. Ljungman and Associates

[57] ABSTRACT

A vibration damper between a vehicle body and/or a vehicle axle, comprising a cylinder in which a piston rod is guided so that it can move axially, whereby the piston rod is connected by way of a first connection to a bearing, and the cylinder is connected by way of an additional connection to a corresponding bearing, whereby the vibration damper runs through at least one bearing and has a self-locking closure by way of at least one radially movable flexible tab. The at least one radially movable flexible tab, by way of its end surface, forms a support for the vibration damper at the bearing in question for one direction, whereby the flexible tab(s) is/are accessible in the release direction, and an elastic clamping body is provided for the opposite direction, so that the vibration damper is restrained by way of the end surface and the clamping body.

15 Claims, 8 Drawing Sheets

VIBRATION DAMPER AND A BEARING SUPPORT FOR A VIBRATION DAMPER

BACKGROUND OF THE INVENTION

1. Field of the Invention

The present invention generally relates to a vibration damper and to a bearing support for a vibration damper between a vehicle body and/or a vehicle axle, such a vibration damper comprising a cylinder in which a piston rod is guided so that it can move axially, whereby the piston rod is connected by means of a first connection to a bearing, and the cylinder is connected by means of an additional connection to a corresponding bearing, whereby the vibration damper runs through at least one bearing and has a self-locking closure by means of at least one radially moveable flexible tab.

2. Background Information

A similar vibration damper bearing support is known, for example, from German Laid Open Patent Application No. 42 39 889. Bearing supports employing this functional principle permits a fast and easy fastening of a vibration damper, e.g. in a motor vehicle. The basic advantage of a bearing support which uses a snap-on connection is that the vibration damper can be installed as an entire unit by means of a simple insertion and locking movement. For that purpose, the above-referenced laid open patent application discloses flexible tabs which are engaged in an offset dome-shaped component or in a dome-shaped component bent at right angles of the motor vehicle, are bent around a retaining edge, and are thereby secured in both axial directions. Unfortunately, the bearing support used in the vibration damper described above does not make it possible to remove the entire vibration damper in similar simple manner. The pin-type hinge must be disassembled to remove the vibration damper from the offset dome. That means that the snap-on connection offers an advantage only during the initial installation. When the dampers become worn out, the damper must essentially be replaced in the conventional manner, which requires disassembly. An additional disadvantage of this bearing support is that only pin-type hinges can be used as a base. But there are many types of axles which require that the bearing be supported by means of a hinge eye.

OBJECT OF THE INVENTION

An object of the present invention is to create a detachable locking connection for a bearing support, whereby hinge eyes can be used as well as pin-type hinges.

SUMMARY OF THE INVENTION

The present invention teaches that the above object can be accomplished, in accordance with at least one preferred embodiment, if at least one radially movable flexible tab, by means of its end surface, forms a support for the vibration damper on the corresponding bearing for one direction, whereby the flexible tab(s) is/are accessible in the release or unlocking direction, and that there is an elastic clamping body for the opposite direction, so that the vibration damper (s) is/are restrained by means of the end surface(s) and the clamping body. In contrast to the publication cited above, the vibration damper can be removed from the bearing support without having to disassemble the vibration damper itself. The accessibility of the flexible tabs makes it possible to release the bearing. It is particularly advantageous if there are no particular geometric restrictions at the bearing point which is formed by the vehicle body or by the vehicle axle. All that is required is a simple passage opening at any desired bearing point, i.e. including even flat surfaces.

In one advantageous embodiment, the flexible tab(s) are formed by a cup-shaped domed sheet which has a rim which runs at least part of the way around, into which the clamping body is inserted. The domed sheet provides acoustical insulation between the vibration damper and the environment. The clamping bodies equalize installation tolerances. In a further refinement of the invention, the domed sheet separates two elastic bearing bodies of a pin-type bearing from one another. The partitions or separation plates which would otherwise be required are unnecessary.

Alternatively, a domed sheet realized in the form of a cap covers the bearing, whereby the body surfaces which form the interior of the cap serve as an abutment for the clamping body. The result is a very compact bearing, the entire construction of which is installed inside the dome-shaped sheet. The invention also teaches that the clamping body can be a component or an integral part of the elastic bearing body of a pin-type hinge. The clamping body performs a dual function, so that the invention has the same number of parts as a conventional pin-type hinge.

In one advantageous embodiment of the invention, the elastic clamping body forms a modular sub-assembly with a spring guide ring for a spring which surrounds the vibration damper. To suppress noises which occur in the event of a relative movement between the spring and the spring bearing area, rubber or plastic inserts are inserted between the spring bearing area and the spring. This spring bearing area also performs a dual function inside the bearing support.

In an additional embodiment, the flexible tab(s) are formed by a protective tube which surrounds the piston rod. In one appropriate refinement of the invention, the protective tube issues from the elastic bearing bodies of the pin-type hinge and separates them from one another. Thus the protective tube can even perform three individual functions.

One particular advantage of the present invention in accordance with at least one preferred embodiment is that the domed sheet has a pillow block for a hinge eye. It thereby becomes possible to satisfy any special requirement for a certain type of connection of the vibration damper. The pillow block is thereby formed by sheet metal brackets which extend essentially in the axial direction of the vibration damper.

BRIEF DESCRIPTION OF THE DRAWINGS

The invention is explained in greater detail below and is illustrated in the accompanying figures.

DESCRIPTION OF THE PREFERRED EMBODIMENT

Figure 1:
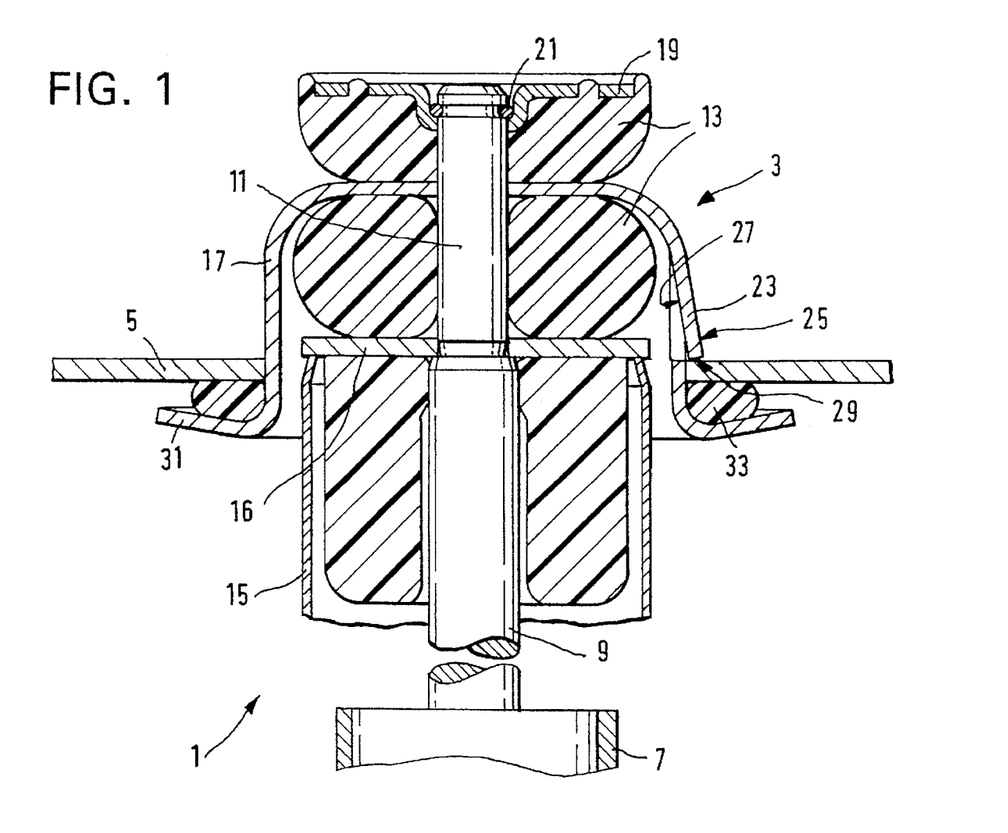
FIGS. 1, 1A, 2, 2A, 3 and 4 show bearing supports with a pin-type hinge.

FIG. 1 shows the upper portion of a vibration damper 1 inside a bearing support 3 at a bearing point of a vehicle body 5, only parts of which are shown in the drawing. A bearing support according to the present invention, however, can also be installed at other connection points. The vibration damper 1 comprises a cylinder 7 in which there is a piston rod 9 which is capable of moving axially. On the portion of the piston rod outside the cylinder 7, there is preferably a pin-type hinge which includes two elastic bearing bodies 13. The piston rod 9 is preferably enclosed by a protective tube 15 to keep out dirt. A cover plate 16 of the protective tube 15 is used as a fastening means. Between the two elastic bearing bodies 13 there is a cup-shaped domed sheet 17, which is oriented so that a fastening disc 19, by means of a fastening ring 21, clamps the entire pin-type hinge in place with the protective tube 15 and the domed sheet 17.

The fastening of the vibration damper 1 can be provided by the domed sheet 17. The domed sheet 17 preferably has at least one, and generally a multiplicity of, radially movable flexible tabs 23, the outside and inside shell surfaces 25; 27 of which are freely accessible. The actual support of the vibration damper is provided by the respective end surfaces 29 of the flexible tabs 23. The support surfaces 29 are preferably supported on the vehicle body 5 so that the vibration damper 1 cannot fall out downward. To fix the vibration damper in position in the opposite direction, the domed sheet is preferably encircled at least partly by a rim 31, into which an elastic clamping body 33 is inserted. This clamping body is preferably engaged on that side of the vehicle body facing away from the end surfaces 29, so that the vehicle body is clamped between the flexible tabs 29 and the clamping body 33.

For installation, the vibration damper 1 is introduced at the bearing point of the vehicle body 5, with pin-type hinge 11 extending through the bearing point. During this installation process, the flexible tabs 23 are elastically deformed radially inward, and after the flexible tabs have reached the upper side of the vehicle body, the flexible tabs assume the illustrated position. The elastic clamping body 33 is thereby deformed so that there is a clearance-free connection between the domed sheet 17 and the vehicle body 5.

Figure 1A:
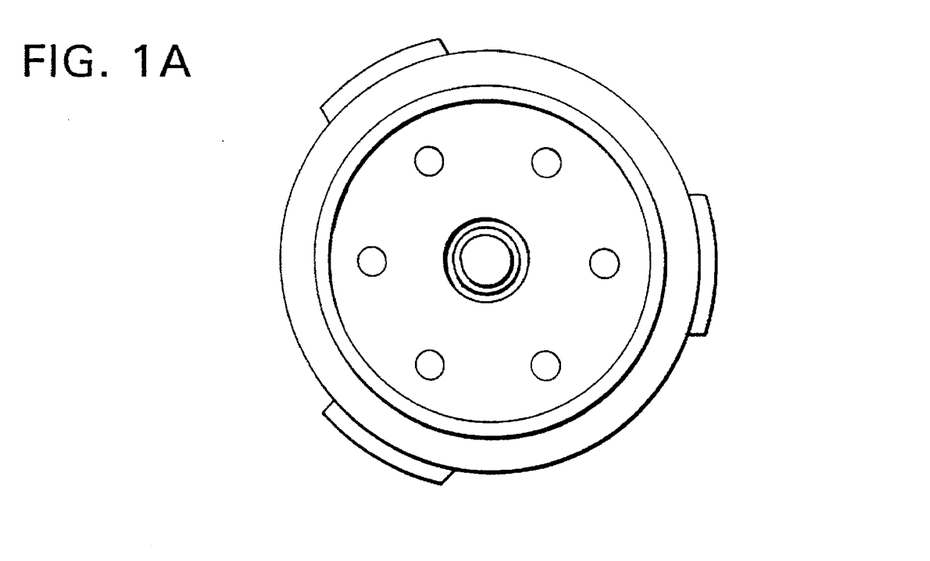

FIG. 1A shows a top view in the axial direction of the vibration damper of FIG. 1.

Figure 2:
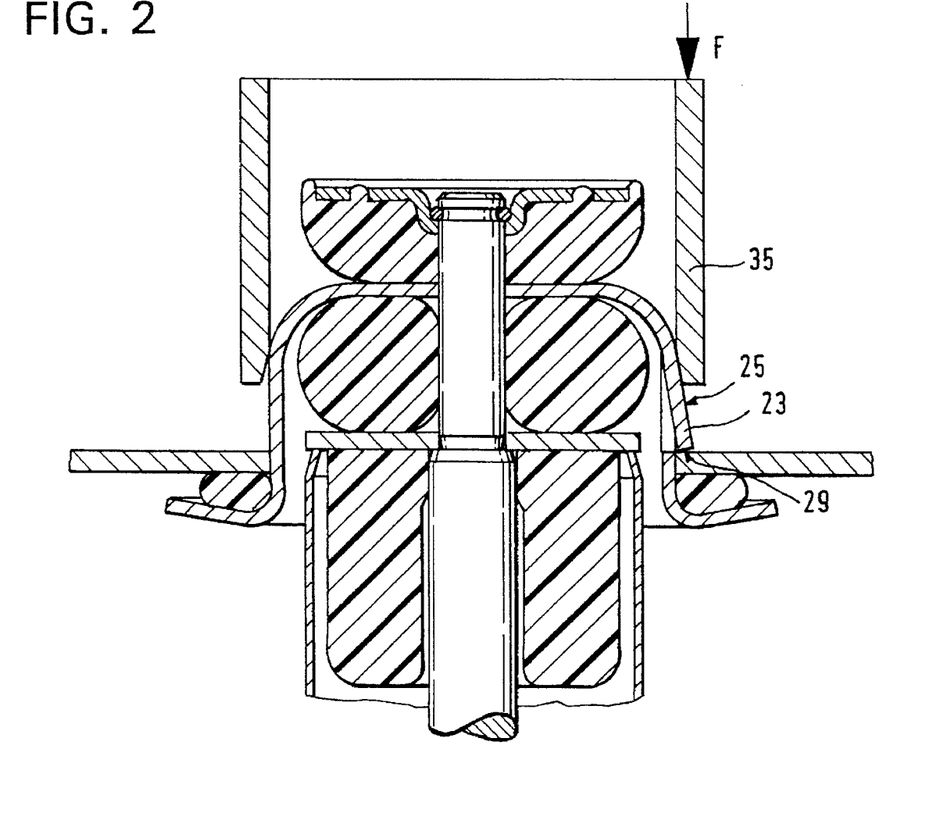

The disassembly, e.g. for repair or replacement, is easily done, as illustrated in FIG. 2. A simple tube 35, the inside diameter of which is preferably smaller than the diameter of the outside shell surface 25 of the flexible tabs 23, can be used to effect an elastic deformation of the flexible tabs radially inward, so that the end surfaces 29 move inside the diameter of the bearing point. The vibration damper can then be easily pulled out of the bearing point.

Figure 3:
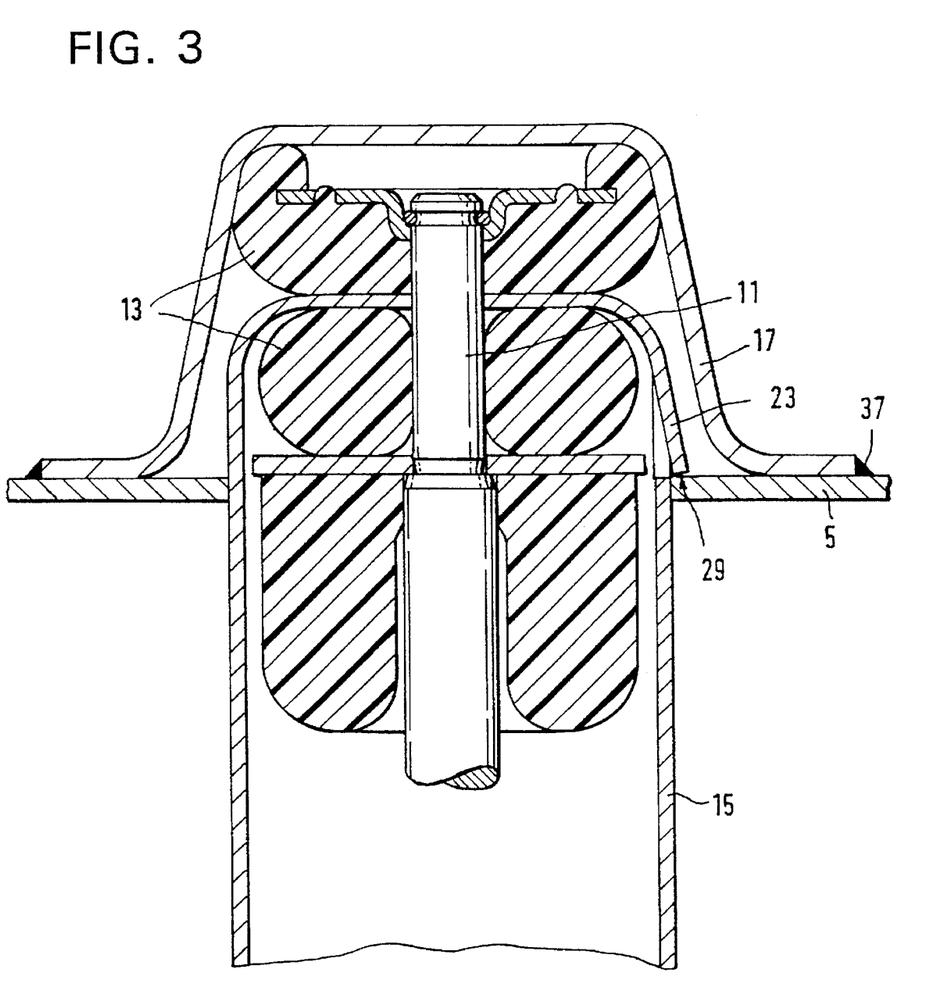

In the embodiment illustrated in FIG. 3, the protective tube has the flexible tabs 23. The protective tube extends from the pin-type hinge 11, where it separates the elastic bearing bodies and thus forms the fastening plane, to the cylinder (not shown). In the vicinity of the bearing point of the vehicle body 5, the flexible tabs 23 are bent outward from the protective tube 15 and are exposed laterally, so that in turn, the end surfaces 29 can be engaged on the vehicle body. The clamping body is constituted by the bearing body 13 of the pin-type hinge, which bearing body 13 supported on the inner wall of the domed sheet 17. The domed sheet can be connected to the vehicle body in any appropriate manner; in this case it is connected by means of a weld seam 37. If necessary, the domed sheet has slots in the vicinity of the flexible tabs 23, so that the flexible tabs can be released.

Figure 2A:
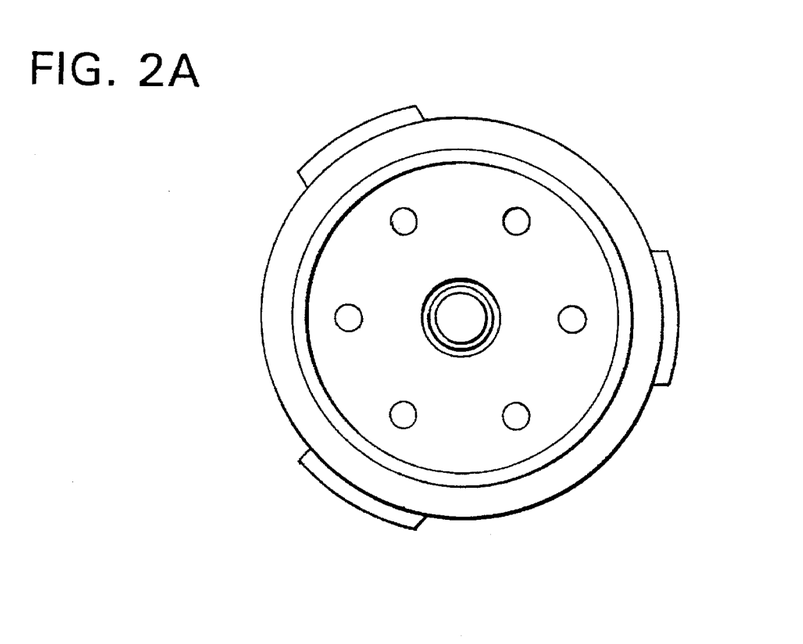

FIG. 2A shows a top view in the axial direction of the vibration damper shown in FIG. 2.

Figure 4:
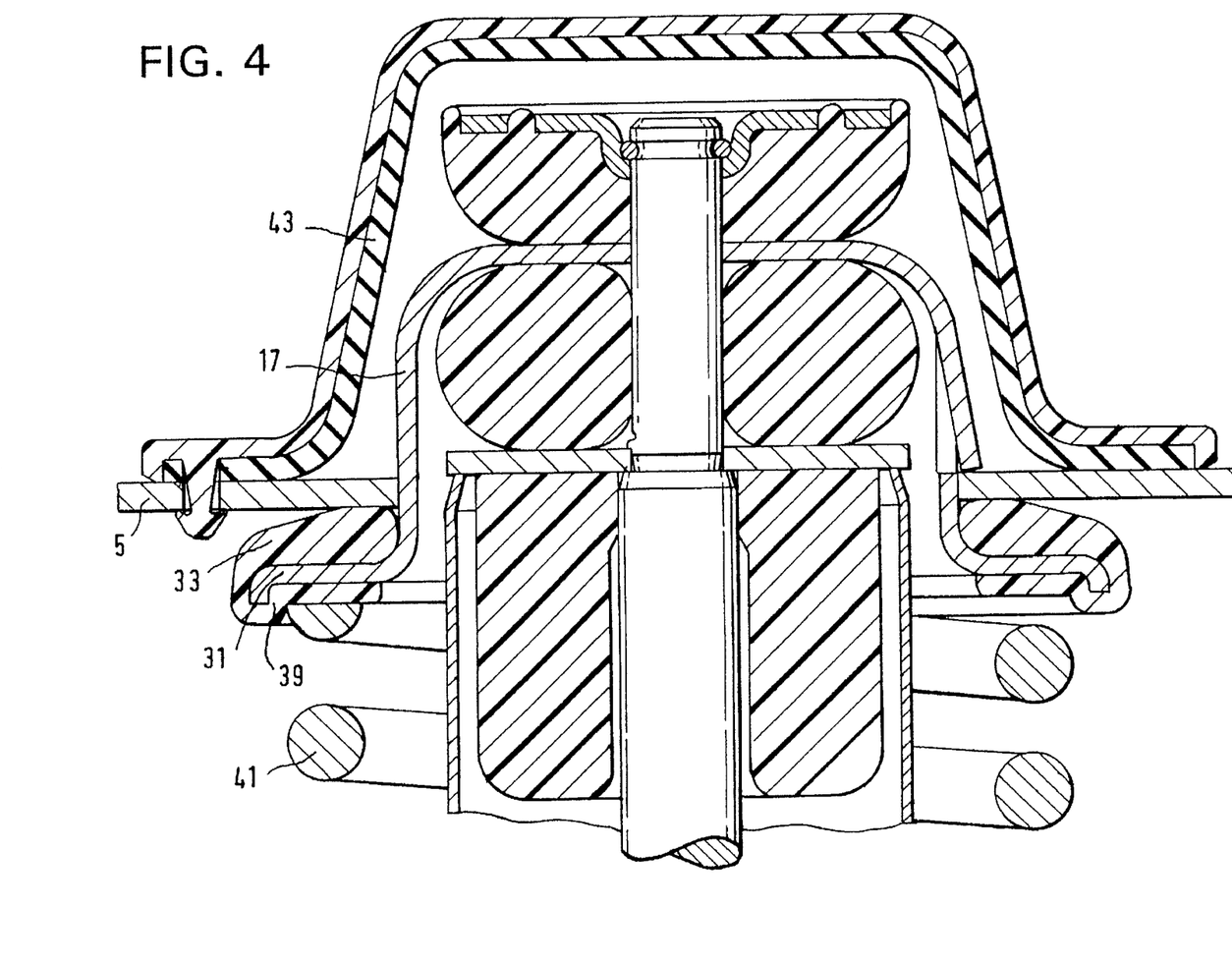

FIG. 4 is largely identical to FIG. 1, except that the clamping body has been combined into a single sub-assembly with a spring guide ring 39, to realize a spring bearing area for a spring 41, whereby the spring bearing area is formed by the rim 31 which runs around the domed sheet 17. By means of the spring 41, a bias is applied to the vibration damper on the vehicle body, whereby the elasticity of the clamping body 33 is used to provide the bias. To provide acoustical insulation, there is an additional cover 43 which can be buttoned in, and which can be removed from the vehicle body if necessary.

Figure 5:
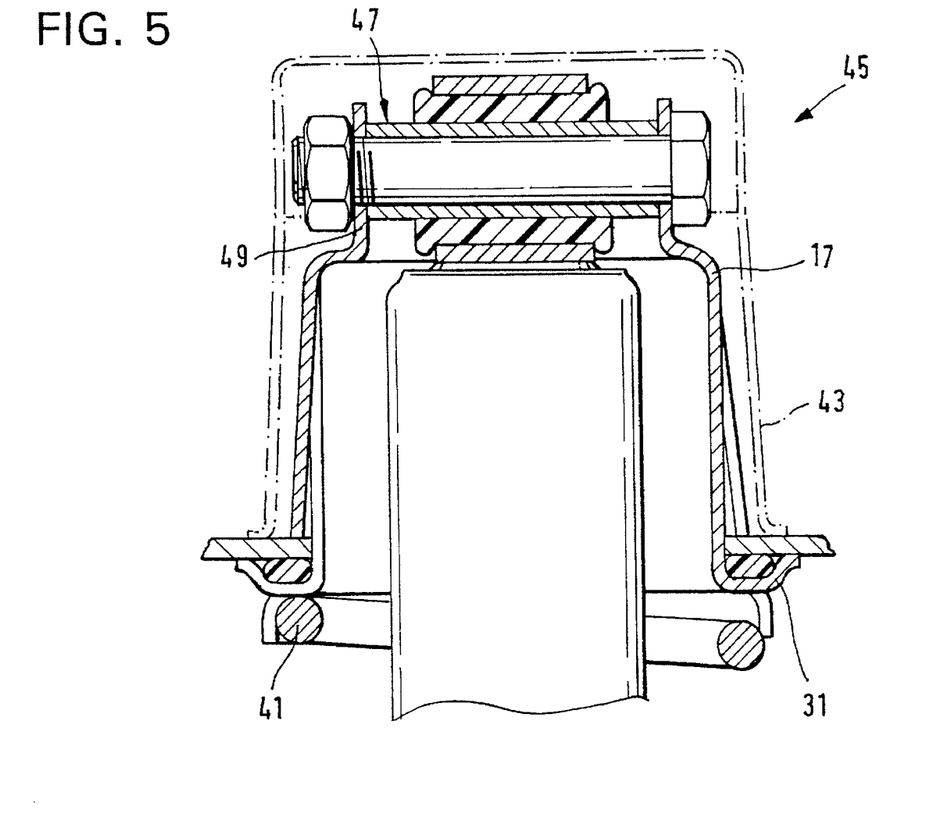
FIGS. 5 and 5A show a bearing support with a hinge eye.

FIG. 5 shows that the principle of the detachable snap connection can also be used with hinge eyes 45. The cup-shaped domed sheet 17 has a pillow block 47 which is formed by sheet metal brackets 49 and is essentially oriented in the axial direction of the vibration damper. The fastening principle is preferably identical to that employed in the versions described above. For example, a spring can also be provided inside a spring bearing area, whereby the spring bearing area is formed from the rim of the domed sheet. A cover 43 can also be used to provide acoustical insulation.

Figure 5A:
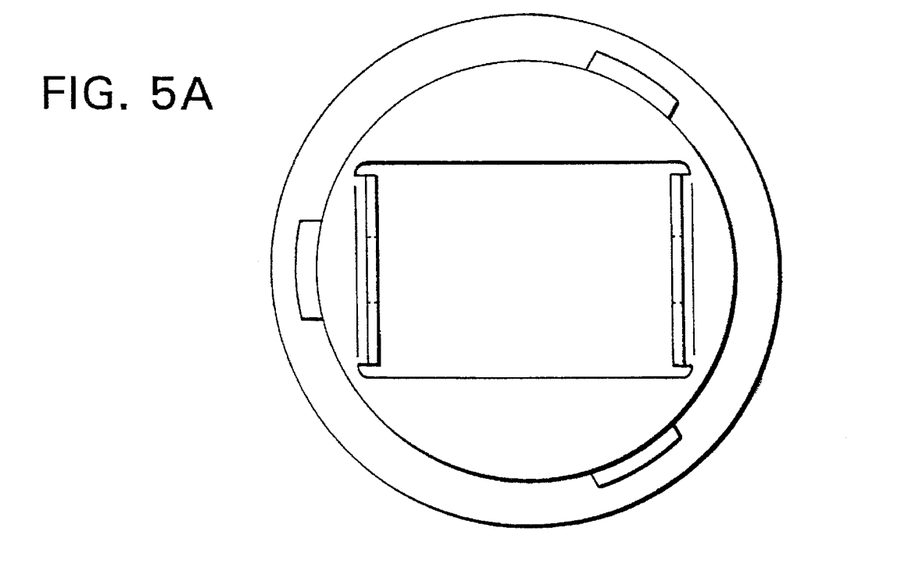

FIG. 5A shows a top view in the axial direction of the vibration damper shown in FIG. 5.

Figure 6:
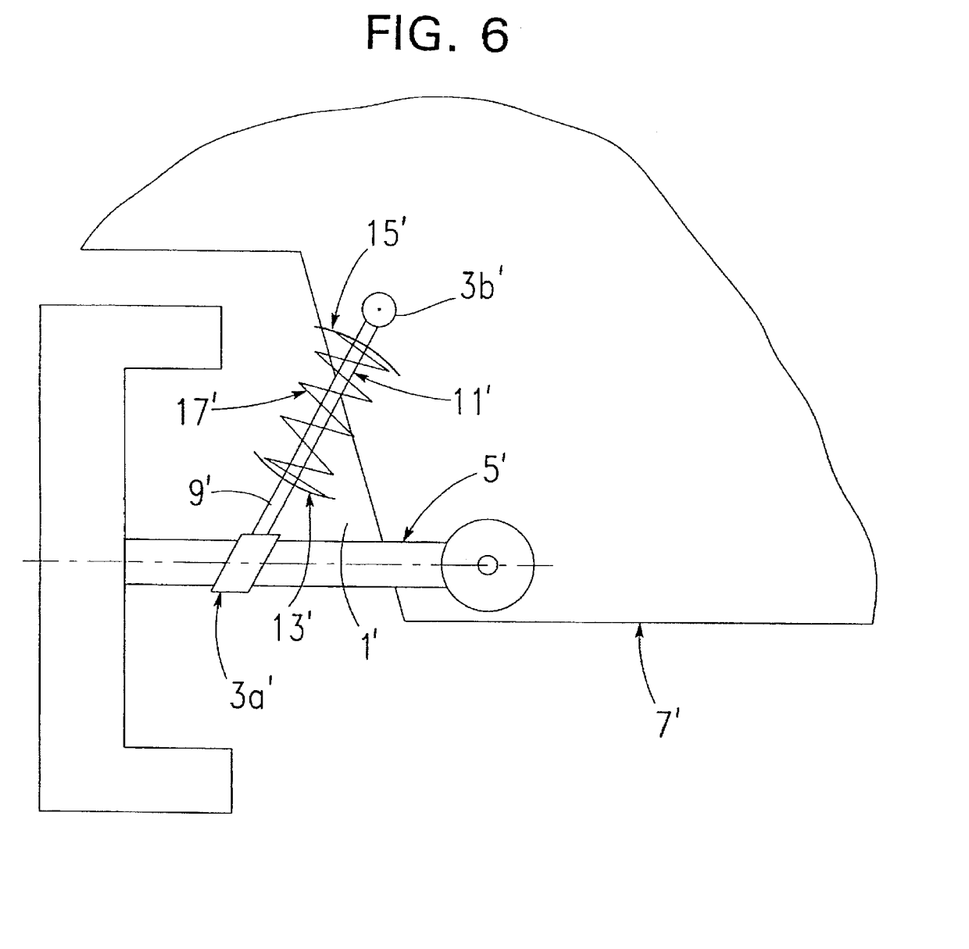
FIG. 6 is a schematic diagram of the installation of a typical vibration damping system which includes a spring support; and, FIGS. 7 and 8 illustrate a shock absorber, and components thereof, which may be utilized in accordance with the embodiments of the present invention.

FIG. 6 is a simplified diagram of the installation of a vibration damping system using a spring support 1', preferably in a motor vehicle. The spring support 1' can be located, essentially in hinged fashion, by means of fastening elements 3a', 3b', between a vehicle axle 5' and a vehicle superstructure 7'. It is generally unimportant as to whether the vehicle axle 5' is an articulated axle or an unarticulated axle.

It will be appreciated that, in accordance with at least one preferred embodiment of the present invention, the bearing support disclosed herein could conceivably be utilized with any or all of the following: one-tube shock absorbers, two-tube shock absorbers, and MacPherson struts. It is conceivable to utilize the bearing support of at least one embodiment of the present invention with other types of vibration dampers. It is conceivable to utilize the bearing support of at least one embodiment of the present invention in different types of motor vehicles, including automobiles and motorcycles.

Figure 7:
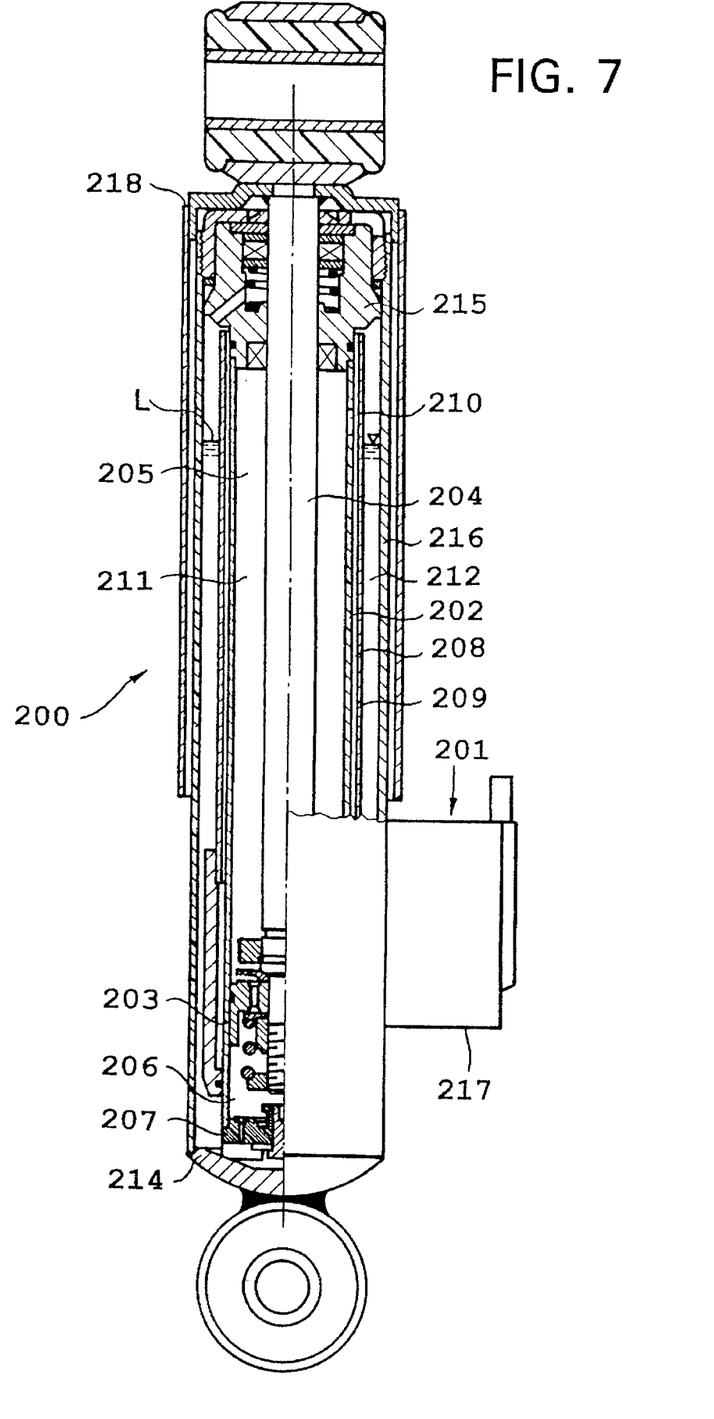
Figure 8:
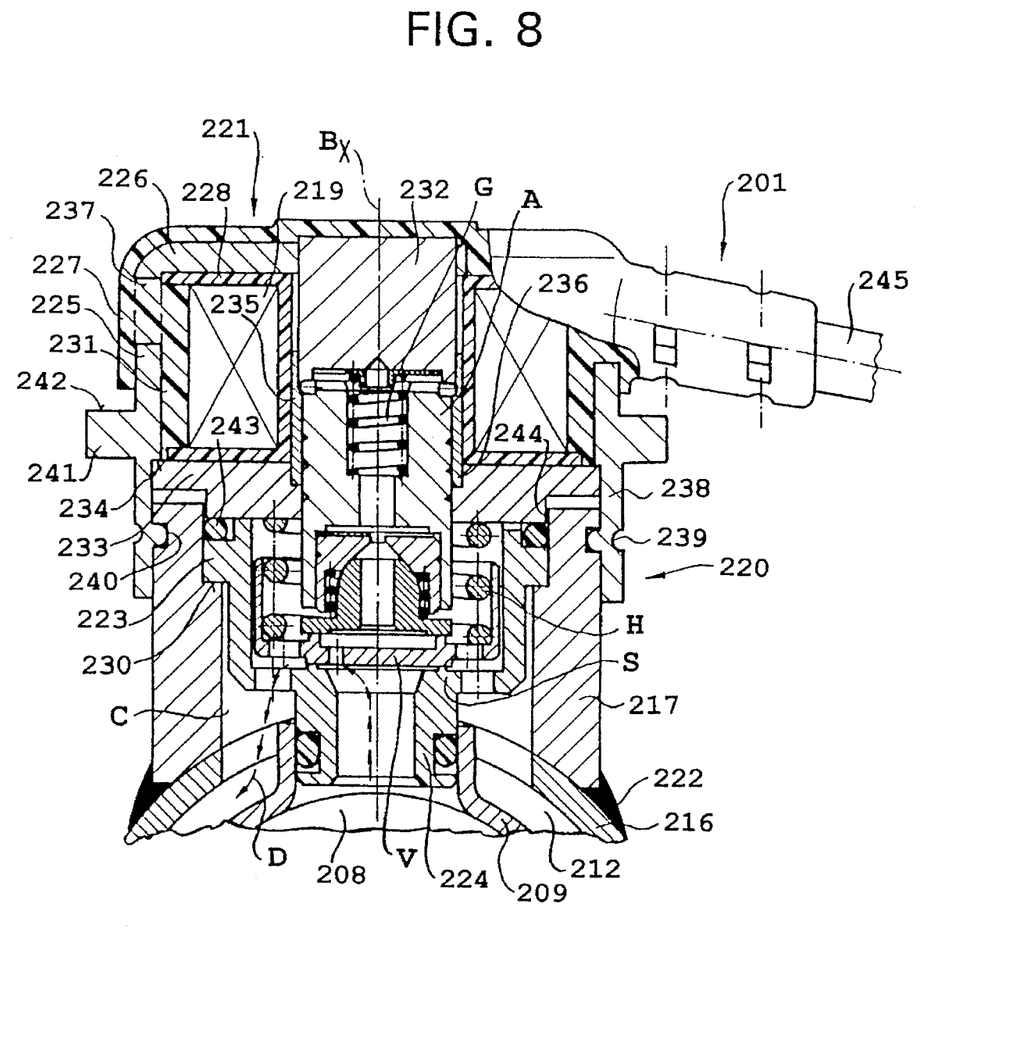

FIGS. 7 and 8 show a typical shock absorber or vibration damper in which the embodiments of the present invention may conceivably be incorporated. It should be understood that the components found hereinbelow may be considered to be interchangeable with similar components discussed hereinabove with reference to FIGS. 1–6.

FIG. 7 shows a complete shock absorber or oscillation damper 200, a detailed illustration of the valve unit 201 being omitted for the sake of clarity. The oscillation damper 200 essentially includes a pressure pipe 202 in which a piston 203 on a piston rod 204 divides a working space 205 into an upper or piston-rod-side working chamber 211 and a lower working chamber 206. A bottom valve unit 207 closes the pressure pipe 202 at the lower end thereof. A fluid path 208 is formed between the pressure pipe 202 and an intermediate pipe 209, said intermediate pipe 209 being arranged concentrically with respect to the pressure pipe 202. A connecting orifice 210 in the pressure pipe 202 connects the upper working chamber 211 with the fluid path 208. A compensating chamber 212 is confined between the intermediate pipe 209 and a portion of the pressure pipe 202, on the one hand, and the container tube 216 on the other hand. This compensating chamber 212 is axially limited by a base member 214 and a piston rod guiding and sealing unit 215. Both the upper and the lower working chambers 211, 206 are preferably filled with a liquid. The compensating chamber 212 is also filled with damping liquid up to the level L, and possibly contains a pressurized gas above the level L. The bottom valve unit 207 provides communication between the working chamber 206 and the compensating chamber 212. The piston 203 provides communication between the lower working chamber 206 and the upper working chamber 211. According to an illustrative example, the oscillation damper works as follows: When the piston rod 204 moves upwards, a high flow resistance occurs across the piston 203 and a high pressure is generated in the upper working chamber 211. Liquid from the upper working chamber 211 flows through said high flow resistance into the lower working chamber 206. As the piston rod 204 moves outward of the working space 205, the available volume within the working space 205 is increased. Therefore, liquid can flow from the compensating chamber 212 through the bottom valve unit 207 into the lower working chamber 206. The flow resistance through the bottom valve unit 207 is small in this phase of operation. The movement of the piston rod 204 with respect to the pressure pipe 202 is damped.

On inward movement of the piston rod 204 fluid flows from the lower working chamber 206 through the piston 203 into the upper working chamber 211. The flow resistance across the piston 203 is relatively small and the flow resistance across the bottom valve unit 207 is relatively large. Therefore, a considerable pressure exists even within the upper working chamber 211. The volume within the working space 205 is reduced by the piston rod 204 entering into the working space 205. Thus, damping liquid must flow from the lower working chamber 206 through the bottom valve unit 207 into the compensating chamber 212. In this phase of operation the flow resistance through the bottom valve unit 207 is high, such that a high pressure occurs within the lower working chamber 206 and also within the upper working chamber 211.

By the connecting orifice 210 and the fluid path 208 the upper working chamber 211 is connected with the compensating chamber 212 via the valve unit 201. This is shown in more detail in FIG. 8, which will be described later. As long as the valve unit 201 is closed, the bypass established by the connecting orifice 210, the fluid path 208 and the valve unit 201 is also closed. This is the hardest mode of operation of the oscillation damper. When, however, the valve unit 201 is more or less opened, the bypass is also open. As a result thereof the following behavior exists: On upward movement of the piston rod 204 liquid can flow from the highly pressurized upper working chamber 211 not only across the piston 203 providing a high flow resistance but also from the working chamber 211 through the bypass 210, 208, 201 to the compensating chamber 212. As such, the damping force can be reduced.

When the piston rod 204 moves downwards, there exists again a high pressure within the upper working chamber 211, as described above. Therefore, damping liquid can flow from the upper working chamber 211 through the bypass 210, 208, 201 to the compensating chamber 212. This means that the damping liquid which must be expelled from the working space 205 as a result of the reduced volume therein does not only escape through the bottom valve unit 207 to the compensating chamber 212 but can also partially escape through the bypass 210, 208, 201 to the compensating chamber 212. As such, the damping force can again be reduced by the open bypass 210, 208, 207. It is to be noted that the direction of flow of the damping liquid through the bypass 210, 208, 207 is the same, both on upward movement and downward movement of the piston rod 204 with respect to the pressure pipe 202. By increasing the flow resistance through the valve unit 201 the damping force can be increased both for upward and downward movement of the piston rod 204, and by increasingly opening the valve unit 201 the damping force can be reduced both for upward movement and downward movement of the piston rod 204. It is possible to selectively open and close the valve unit or to continuously vary the flow resistance through the valve unit 201.

In FIG. 8 one can again see the fluid path 208 and the compensating chamber 212, which are interconnectable through the valve unit 201. The fluid path 208 is connected to the upper working chamber 211 as shown in FIG. 7. The flow direction from the fluid path 208 to the compensating chamber 212 across the valve unit 201 is indicated in FIG. 8 by the dotted line D provided with arrows indicating the flow direction both for inward movement and outward movement of the piston rod 204 with respect to the pressure pipe 202. One can see in FIG. 8 a valve member V which can be lifted with respect to a valve seat S, such as to open the flow path D from the fluid path 208 to the compensating chamber 212.

In at least some of the embodiments the elastic bodies, namely the elastic bearing bodies and the elastic clamping bodies, may be predominantly in a toroidal configuration.

One feature of the invention resides broadly in the bearing support for a vibration damper between a vehicle body and/or a vehicle axle, comprising a cylinder in which a piston rod is guided so that it can move axially, whereby the piston rod is connected by means of a first connection to a bearing, and the cylinder is connected by means of an additional connection to a corresponding bearing, whereby the vibration damper runs through at least one bearing and has a self-locking closure by means of at least one radially movable flexible tab, characterized by the fact that at least one radially movable flexible tab 23, by means of its end surface 29, forms a support for the vibration damper at the bearing in question for one direction, whereby the flexible tab(s) is/are accessible in the release direction, and that an elastic clamping body (33) is provided for the opposite direction, so that the vibration damper is restrained by means of the end surface and the clamping body.

Another feature of the invention resides broadly in the bearing support characterized by the fact that the flexible tab(s) 23 is/are formed by a cup-shaped domed sheet 17, which is encircled at least part of the way by an encircling rim 31 into which the clamping body is inserted.

Yet another feature of the invention resides broadly in the bearing support characterized by the fact that the domed sheet separates two elastic bearing bodies 13 of a pin-type hinge 11 from one another.

Still another feature of the invention resides broadly in the bearing support characterized by the fact that a domed sheet realized in the form of a locking cap covers the bearing point, whereby the body surfaces which form the interior of the cap form an abutment for the clamping body.

A further feature of the invention resides broadly in the bearing support characterized by the fact that the clamping body 33 is a component of the elastic bearing body 13 of a pin-type hinge.

Another feature of the invention resides broadly in the bearing support characterized by the fact that the elastic clamping body 33 forms a component with a spring guide ring 39 for a spring 41 which surrounds the vibration damper.

Yet another feature of the invention resides broadly in the bearing support characterized by the fact that the flexible tab(s) is/are formed by a protective tube 15 which surrounds the piston rod.

Still another feature of the invention resides broadly in the bearing support characterized by the fact that the protective tube issues from the elastic bearing bodies of the pin-type hinge and separates them from one another.

A further feature of the invention resides broadly in the bearing support characterized by the fact that the domed sheet has a pillow block 47 for a hinge eye 45.

Another feature of the invention resides broadly in the bearing support characterized by the fact that the pillow block is formed by sheet metal brackets 49 which extend essentially in the axial direction of the vibration damper.

Examples of vibration damper(s) and/or vibration damper systems which can be utilized in accordance with the present invention may be disclosed by the following U.S. Patent Application Ser. No. 08/344,745 which submitted by Sydekum et al. with a filing date of Nov. 23, 1994, entitled "Vibration Damper Assembly Having a Spring Support with Adjustable Spring Plate, and a Spring Support with Adjustable Spring Plate." Examples of vibration damper(s) and/or vibration damper systems which can be utilized in accordance with the present invention may be disclosed by the following French Patent: No. 2,548,972-A1, which issued to Le Salver and Poupard on Jan. 18, 1985, entitled "Dispositif de Liaison a Articulation Souple et Capacite Hydraulique, pour Amortisseur de Vehicular Automobile."

Examples of shock absorber assemblies which may be utilized in accordance with the embodiments of the present invention, may be disclosed in the following U.S. Patents: U.S. Pat. No. 4,838,393, which issued to Mourray et al. on Jun. 13, 1989, entitled "Hydro-Mechanical Stop having a Restrictive Passage"; U.S. Pat. No. 4,817,928, which issued to Paton on Apr. 4, 1989, entitled "Suspension System"; U.S. Pat. No. 4,527,674, which issued to Mourray on Jul. 9, 1985, entitled "Shock Absorber with a Hydro-Mechanical Stop"; and U.S. Pat. No. 4,749,069, which issued to Knecht et al. on Jun. 7, 1988, entitled "Vibration Damper for Motor Vehicles having an Arrangement for Varying Damping thereof." Examples of shock absorber assemblies which can be utilized in accordance with the present invention may be disclosed by the following French Patent: No. 2,563,302-A1, which issued to Urban Agren and Sigvard Zetterstrom on Oct. 25, 1985, entitled "Monture de Jambe de Suspension pour un Vehicle a Moteur"; and European Patent: No. 0,028,692-A1, which issued to Dr. Ing.h.c. F. Porsche Aktiengesellschaft, on May 20, 1981, entitled "Hinterachse fur Kraftfahrzeuge."

Examples of Macpherson struts, which may be utilized in accordance with the embodiments of the present invention, may be found in the following U.S. Patents: U.S. Pat. No. 4,944,524 which issued to Achenbach on Jul. 31, 1990, entitled "Telescoping Strut Suspension with Friction Reducing Torsional Unloading Device"; and U.S. Pat. No. 4,477,061 issued to Kawaura et al., on Oct. 16, 1984, entitled "Strut Type Suspension." Examples of Macpherson struts, which may be utilized in accordance with the embodiments of the present invention, may be found in the following European Patent: No. 0,249,369, which issued to Knable et al., on Dec. 16, 1987, entitled "Vehicle Suspension Strut Assembly including an Upper Mount."

The invention as described hereinabove in the context of the preferred embodiments is not to be taken as limited to all of the provided details thereof, since modifications and variations thereof may be made without departing from the spirit and scope of the invention.

What is claimed is:

1. A vibration damper for a motor vehicle, said vibration damper comprising:

a sealed cylinder defining a chamber therein;
said cylinder defining an axis;
said cylinder containing a damping fluid;
a piston rod sealingly projecting into said cylinder and being axially displaceable with respect to said cylinder;
a support structure for securing said vibration damper to the motor vehicle;
said support structure comprising:
   a bearing support;
   said bearing support comprising:
      means for self-locking said bearing support to the motor vehicle;
      said means for self-locking comprising at least one radially movable flexible tab;
      said at least one flexible tab comprising means for providing support to said vibration damper in a first direction along said axis;
      a clamping body;
      said clamping body comprising means for providing support to said vibration damper in a second direction along said axis;
      said second direction being opposite said first direction;
      said clamping body comprising an elastic material;
      said at least one flexible tab and said clamping body comprising means for bracing said vibration damper to the motor vehicle;
      said at least one flexible tab comprising means for permitting detachment of said vibration damper from the motor vehicle;
      said at least one flexible tab comprising an end surface;
      said end surface being disposed to contact a portion of the motor vehicle and provide the support to said vibration damper in the first direction;
      a sheet having a cup-shape;
      said cup-shaped sheet being disposed substantially concentrically about said axis;
      said cup-shaped sheet having a bottom portion and a side portion;
      said bottom portion being disposed substantially orthogonal to said axis;
      said side portion of said cup-shaped sheet having a first end, a second end and a middle portion;
      said first end and said second end being disposed substantially opposite one another;
      said first end being disposed adjacent said bottom portion, and said second end being disposed a substantial distance from said first end in a direction toward said vibration damper;
      said middle portion being disposed between said first end and said second end;
      said at least one flexible tab being disposed on said middle portion;
      said second end comprising a rim portion;
      said rim portion extending in a radial direction with respect to said axis; and
      said rim portion comprising means for receiving said clamping body.

2. The vibration damper according to claim 1, wherein:
said bearing support further comprises a pin-type hinge disposed along said axis;
said bearing support further comprises two bearing bodies disposed substantially concentrically about said pin-type hinge;
said cup-shaped sheet is disposed between, and separates, said two bearing bodies;

each of said two bearing bodies comprise an elastic material; and said vibration damper further comprises an additional support structure for securing said cylinder to the motor vehicle.

3. The vibration damper according to claim 1, wherein:

said clamping body and said rim portion together comprise bracket means for holding a spring adjacent said vibration damper; and said vibration damper further comprises an additional support structure for securing said cylinder to the motor vehicle.

4. The vibration damper according to claim 1, wherein said bearing support further comprises:

a hinge;

said bottom portion of said cup-shaped sheet comprising pillow-block bearing means for receiving said hinge therein.

5. The vibration damper according to claim 4, wherein:

said pillow-block bearing means comprises metal brackets;

said metal brackets being disposed so as to extend substantially along said axis; and said vibration damper further comprises an additional support structure for securing said cylinder to the motor vehicle.

6. A vibration damper for a motor vehicle, said vibration damper comprising:

a sealed cylinder defining a chamber therein;

said cylinder defining an axis;

said cylinder containing a damping fluid;

a piston rod sealingly projecting into said cylinder and being axially displaceable with respect to said cylinder;

a support structure for securing said vibration damper to the motor vehicle;

said support structure comprising:
 a bearing support;
 said bearing support comprising:
  means for self-locking said bearing support to the motor vehicle;
  said means for self-locking comprising at least one radially movable flexible tab;
  said at least one flexible tab comprising means for providing support to said vibration damper in a first direction along said axis;
  a clamping body;
  said clamping body comprising means for providing support to said vibration damper in a second direction along said axis;
  said second direction being opposite said first direction;
  said clamping body comprising an elastic material;
  said at least one flexible tab and said clamping body comprising means for bracing said vibration damper to the motor vehicle;
  said at least one flexible tab comprising means for permitting detachment of said vibration damper from the motor vehicle;
  said at least one flexible tab comprising an end surface;
  said end surface being disposed to contact a portion of the motor vehicle and provide the support to said vibration damper in the first direction;
 cover means for substantially enclosing said bearing support;

said cover means comprising a sheet having a cup-shape;

said cup-shaped sheet being disposed concentrically about said axis;

said cup-shaped sheet having a bottom portion and a side portion;

said bottom portion being disposed substantially orthogonal to said axis;

said side portion having a first end, a second end and a middle portion;

said first end and second end being disposed substantially opposite one another;

said first end being disposed adjacent said bottom portion, and said second end being disposed a substantial distance from said first end in a direction toward said vibration damper;

said middle portion being disposed between said first end and said second end;

said second end comprising means for fixedly attaching said cup-shaped sheet to a portion of the motor vehicle;

said cup-shaped sheet comprising an inner surface facing toward said axis and an outer surface facing away from said axis;

said inner surface comprising a bottom inner surface area and a side inner surface area;

said bottom inner surface area forming part of said bottom portion;

said side inner surface area forming part of said side portion; and at least a portion of said bottom inner surface area and at least a portion of said side inner surface area being disposed to form an abutment for said clamping body.

7. The vibration damper according to claim 6, wherein:

said bearing support further comprises a pin-type hinge;

said bearing support further comprises at least one elastic bearing body disposed about said pin-type hinge;

said at least one elastic bearing body comprises said clamping body; and said vibration damper further comprises an additional support structure for securing said cylinder to the motor vehicle.

8. A vibration damper for a motor vehicle, said vibration damper comprising:

a sealed cylinder defining a chamber therein;

said cylinder defining an axis;

said cylinder containing a damping fluid;

a piston rod sealingly projecting into said cylinder and being axially displaceable with respect to said cylinder;

a support structure for securing said vibration damper to the motor vehicle;

said support structure comprising:
 a bearing support;
 said bearing support comprising:
  means for self-locking said bearing support to the motor vehicle;
  said means for self-locking comprising at least one radially movable flexible tab;
  said at least one flexible tab comprising means for providing support to said vibration damper in a first direction along said axis;
  a clamping body;
  said clamping body comprising means for providing support to said vibration damper in a second direction along said axis;

said second direction being opposite said first direction;

said clamping body comprising an elastic material;

said at least one flexible tab and said clamping body comprising means for bracing said vibration damper to the motor vehicle;

said at least one flexible tab comprising means for permitting detachment of said vibration damper from the motor vehicle;

said at least one flexible tab comprising an end surface;

said end surface being disposed to contact a portion of the motor vehicle and provide the support to said vibration damper in the first direction;

said bearing support further comprising a tube disposed concentrically about said piston rod;

said at least one flexible tab being disposed on said tube;

said tube comprising a first portion and a second portion;

said first portion comprising an end portion disposed substantially orthogonal to said axis;

said bearing support further comprising a pin-type hinge;

said bearing support further comprising two bearing bodies disposed concentrically about said pin-type hinge;

said end portion being disposed between, and separating, said two bearing bodies;

each of said two bearing bodies comprising an elastic material; and said vibration damper further comprising an additional support structure for securing said cylinder to the motor vehicle.

9. A bearing support for a vibration damper of a motor vehicle, said bearing support comprising:

means for receiving a vibration damper piston rod;

means for self-locking said bearing support to the motor vehicle;

said means for self-locking comprising at least one radially movable flexible tab;

said at least one flexible tab comprising means for providing support to the vibration damper in a first direction along said axis;

a clamping body;

said clamping body comprising means for providing support to the vibration damper in a second direction along said axis;

said second direction being opposite said first direction;

said clamping body comprising an elastic material;

said at least one flexible tab and said clamping body together comprising means for bracing the vibration damper to the motor vehicle;

said at least one flexible tab comprising means for permitting detachment of the vibration damper from the motor vehicle;

said at least one flexible tab comprising an end surface;

said end surface being disposed to contact a portion of the motor vehicle and provide the support to said vibration damper in the first direction;

a sheet having a cup-shape;

said cup-shaped sheet being disposed substantially concentrically about said axis;

said cup-shaped sheet having a bottom portion and a side portion;

said bottom portion being disposed substantially orthogonal to said axis;

said side portion having a first end, a second end and a middle portion;

said first end and said second end being disposed substantially opposite one another;

said first end being disposed adjacent said bottom portion, and said second end being disposed a substantial distance from said first end in a direction toward said vibration damper;

said middle portion being disposed between said first end and said second end;

said at least one flexible tab being disposed on said middle portion;

said second end comprising a rim portion;

said rim portion extending in a radial direction with respect to said axis; and said rim portion comprising means for receiving said clamping body.

10. The bearing support according to claim 9, wherein said bearing support further comprises:

a pin-type hinge;

two bearing bodies disposed substantially concentrically about said pin-type hinge;

said cup-shaped sheet being disposed between, and separates, said two bearing bodies;

each of said two bearing bodies comprising an elastic material; and the vibration damper comprises a cylinder and a support structure for securing the cylinder to the motor vehicle.

11. The bearing support according to claim 9 wherein:

said clamping body and said rim portion together comprise bracket means for holding a spring adjacent said vibration damper; and the vibration damper comprises a cylinder and a support structure for securing the cylinder to the motor vehicle.

12. The bearing support according to claim 9, wherein said bearing support further comprises:

a hinge;

said bottom portion of said cup-shaped sheet comprising pillow-block bearing means for receiving said hinge therein;

said pillow-block bearing means comprising metal brackets;

said metal bracket being disposed so as to extend substantially along said axis; and the vibration damper comprises a cylinder and a support structure for securing the cylinder to the motor vehicle.

13. A bearing support for a vibration damper of a motor vehicle, said bearing support comprising:

means for receiving a vibration damper piston rod;

means for self-locking said bearing support to the motor vehicle;

said means for self-locking comprising at least one radially movable flexible tab;

said at least one flexible tab comprising means for providing support to the vibration damper in a first direction along said axis;

a clamping body;

said clamping body comprising means for providing support to the vibration damper in a second direction along said axis;

said second direction being opposite said first direction;

said clamping body comprising an elastic material;

said at least one flexible tab and said clamping body together comprising means for bracing the vibration damper to the motor vehicle;

said at least one flexible tab comprising means for permitting detachment of the vibration damper from the motor vehicle;

said at least one flexible tab comprising an end surface;

said end surface being disposed to contact a portion of the motor vehicle and provide the support to said vibration damper in the first direction;

cover means for substantially enclosing said bearing support;

said cover means comprising a sheet having a cup-shape;

said cup-shaped sheet being disposed concentrically about said axis;

said cup-shaped sheet having a bottom portion and a side portion;

said bottom portion being disposed substantially orthogonal to said axis;

said side portion having a first end, a second end and a middle portion;

said first end and second end being disposed substantially opposite one another;

said first end being disposed adjacent said bottom portion, and said second end being disposed a substantial distance from said first end in a direction toward said vibration damper;

said middle portion being disposed between said first end and said second end;

said second end comprising means for fixedly attaching said cup-shaped sheet to a portion of the motor vehicle;

said cup-shaped sheet comprising an inner surface facing toward said axis and an outer surface facing away from said axis;

said inner surface comprising a bottom inner surface area and a side inner surface area;

said bottom inner surface area forming a part of said bottom portion;

said side inner surface area forming a part of said side portion; and at least a portion of said bottom inner surface area and at least a portion of said side inner surface area being disposed to form an abutment for said clamping body.

14. The bearing support according to claim 13, wherein said bearing support further comprises:

a pin-type hinge;

at least one elastic bearing body disposed substantially concentrically about said pin-type hinge;

said at least one elastic bearing body comprises said clamping body; and the vibration damper comprises a cylinder and a support structure for securing the cylinder to the motor vehicle.

15. A bearing support for a vibration damper of a motor vehicle said bearing support comprising:

means for receiving a vibration damper piston rod;

means for self-locking said bearing support to the motor vehicle;

said means for self-locking comprising at least one radially movable flexible tab;

said at least one flexible tab comprising means for providing support to the vibration damper in a first direction along said axis;

a clamping body;

said clamping body comprising means for providing support to the vibration damper in a second direction along said axis;

said second direction being opposite said first direction;

said clamping body comprising an elastic material;

said at least one flexible tab and said clamping body together comprising means for bracing the vibration damper to the motor vehicle;

said at least one flexible tab comprising means for permitting detachment of the vibration damper from the motor vehicle;

said at least one flexible tab comprising an end surface;

said end surface being disposed to contact a portion of the motor vehicle and provide the support to said vibration damper in the first direction;

a tube disposed concentrically about said piston rod;

said at least one flexible tab being disposed on said tube;

said tube comprising a first portion and a second portion;

said first portion comprising an end portion disposed substantially orthogonal to said axis;

a pin-type hinge;

two bearing bodies being disposed substantially concentrically about said pin-type hinge;

said end portion of said tube being disposed between, and separating, said two bearing bodies;

each of said two bearing bodies comprising an elastic material; and the vibration damper comprising a cylinder and a support structure for securing the cylinder to the motor vehicle.

* * * * *